(12) United States Patent
Varanasi et al.

(10) Patent No.: US 8,327,752 B2
(45) Date of Patent: Dec. 11, 2012

(54) FLUIDIC ACTUATOR FOR APPLICATION INSIDE TURBOMACHINERY

(75) Inventors: Kripa Kiran Varanasi, Clifton Park, NY (US); Shorya Awtar, Clifton Park, NY (US); Frederick George Baily, Ballston Spa, NY (US); Mark Edward Burnett, Barton, NY (US); Farshad Ghasripoor, Scotia, NY (US); Imdad Imam, Schenectady, NY (US); Norman Arnold Turnquist, Sloansville, NY (US)

(73) Assignee: General Electric Company, Niskayuna, NY (US)

( * ) Notice: Subject to any disclaimer, the term of this patent is extended or adjusted under 35 U.S.C. 154(b) by 1498 days.

(21) Appl. No.: 11/588,952

(22) Filed: Oct. 27, 2006

(65) Prior Publication Data

US 2008/0098884 A1    May 1, 2008

(51) Int. Cl.
*F16J 9/16* (2006.01)
(52) U.S. Cl. .................................................. 92/165 PR
(58) Field of Classification Search ............... 92/165 PR
See application file for complete search history.

(56) References Cited

U.S. PATENT DOCUMENTS

| | | | | |
|---|---|---|---|---|
| 1,646,143 A | * | 10/1927 | Forster | 277/447 |
| 3,268,232 A | * | 8/1966 | Richards | 277/398 |
| 3,520,542 A | * | 7/1970 | Fruehauf | 277/530 |
| 4,058,084 A | * | 11/1977 | Kawaguchi et al. | 277/587 |
| 4,207,800 A | * | 6/1980 | Homuth | 91/26 |
| 5,560,278 A | * | 10/1996 | Lark | 277/468 |
| 5,974,948 A | * | 11/1999 | Thompson et al. | 92/165 PR |
| 6,502,823 B1 | | 1/2003 | Turnquist et al. | 277/355 |
| 6,572,115 B1 | | 6/2003 | Sarshar et al. | 277/412 |
| 6,655,696 B1 | | 12/2003 | Fang et al. | 277/409 |
| 6,786,487 B2 | | 9/2004 | Dinc et al. | 277/355 |
| 2002/0145259 A1 | * | 10/2002 | Chalk | 277/447 |

\* cited by examiner

*Primary Examiner* — F. Daniel Lopez
(74) *Attorney, Agent, or Firm* — Ann M. Agosti

(57) ABSTRACT

Disclosed is an actuator that includes a cylinder having an input port, a piston disposed at least partially inside of the cylinder, and one or more piston rings disposed in a circumferential piston ring groove or grooves. The actuator also includes at least one spring, inserted into the circumferential piston ring groove adjacent to the one or more piston rings and a high pressure side of said piston ring. The spring preloads the one or more piston rings to seal between a low pressure face of the one or more piston rings and a low pressure face of the circumferential piston ring groove. The invention also includes a method for moving an adjustable seal in a radial direction using the piston-ring sealed actuator. The method includes moving the adjustable seal in an axial direction, breaking a primary axial contact between the adjustable seal and a primary sealing face.

18 Claims, 3 Drawing Sheets

FLUIDIC ACTUATOR FOR APPLICATION INSIDE TURBOMACHINERY

BACKGROUND OF THE INVENTION

1. Field of the Invention

The subject invention relates to an actuator for turbomachinery and an application thereof. More particularly, the invention relates to an actuator for turbomachinery that includes an improved piston ring configuration for sealing between the actuator's piston and cylinder, and an improved method for actuating adjustable seals in turbomachinery.

2. Description of Background

Fluidic actuators within turbomachinery are typically exposed to a harsh environment of very high temperatures and pressures and employ high actuation pressures of up to 3,000 pounds per square inch to move components such as packing rings and adjustable seals.

One factor that limits the amount of force an actuator can apply is the effectiveness of the sealing of the actuator. The more effective the sealing, the lower the leakage of actuation fluid, and the higher the possible actuation force. As sealing becomes less effective, lower actuation forces are possible with each actuator, thus a greater quantity of actuators must be utilized to move a desired component. If more effective sealing is achieved, it is possible to increase the amount of force applied by each actuator and therefore the number of actuators required to move a desired component may be reduced.

A bellows actuator is one type of actuator that is used in turbomachinery applications. A bellows actuator includes a cylinder with a piston disposed therein and a bellows connecting the piston to the cylinder, providing sealing between the cylinder and the piston, and thus creating a high pressure region and a low pressure region. With the bellows in place, there is effectively zero leakage between the high pressure region and the low pressure region. However, the bellows are susceptible to failure by conditions such as overpressurization of the actuator, reverse pressurization across the actuator, side loads, moisture in the actuation air, debris in the operating environment, and other conditions, that limit the life of the bellows and consequently the effective life of the actuator. Failure of the bellows may lead to a reduction in the maximum actuation force that the actuator can reliably apply, or an entirely nonfunctional actuator.

An alternative to the bellows actuator is the piston ring sealed actuator. Like the bellows actuator, the piston ring sealed actuator includes a cylinder with a piston disposed therein. In this case, however, the sealing is provided by one or more piston rings inserted into a piston ring groove or grooves in the piston, or alternatively inserted into a groove or grooves in the cylinder. While a piston ring seal is less susceptible to failure than a bellows seal, at the high pressures and temperatures present in the turbomachinery environment, a typical actuator with a piston ring seal is susceptible to leakage between the piston ring and the cylinder wall, and between the piston ring and the piston ring groove. Because of this leakage, the actuation force of an actuator with a typical piston ring seal arrangement is also limited, and more actuators than desired are needed to move components within the turbomachinery. Furthermore, more actuation fluid is needed to provide the desired actuation.

As indicated above, it is advantageous to have actuators with a long useful life that exhibit nearly zero leakage in the high pressure, high temperature environment inside of turbomachinery. With longer life and more effective sealing, higher actuation forces can be applied to the actuator, thus reducing the number of actuators required to move a desired component. Low leakage actuators also require less actuation fluid, which makes the overall actuation system design simpler. What is needed is an actuator seal configuration with long life and exhibiting nearly zero leakage from the high pressure side of the actuator to the low pressure side of the actuator.

SUMMARY OF THE INVENTION

The present invention solves the aforementioned problems by improving sealing in an actuator that includes a cylinder having an input port, a piston disposed at least partially inside of the cylinder, and one or more piston rings disposed in a circumferential piston ring groove or grooves. The actuator also includes at least one spring, inserted into the circumferential piston ring groove adjacent to the one or more piston rings and a high pressure side of said piston ring.

The spring preloads the one or more piston rings to seal between a low pressure face of the one or more piston rings and a low pressure face of the circumferential piston ring groove.

The invention also includes a method for moving an adjustable seal in a radial direction using the piston-ring sealed actuator. The method includes moving the adjustable seal in an axial direction, breaking a primary axial contact between the adjustable seal and a primary sealing face. Breaking the primary axial contact reduces a radial pressure force acting on the adjustable seal. As a result, an amount of force required to move the adjustable seal in a radial direction is reduced. The adjustable seal is moved in the radial direction using fewer actuators or actuators each having lower actuation force.

These and other objects and features of the present invention will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Figure 1:
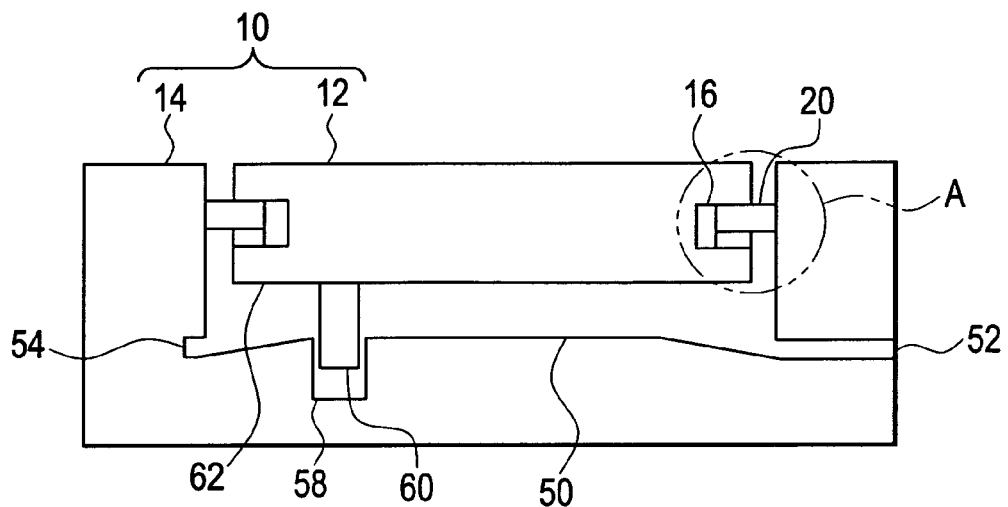
FIG. 1 is a cross-sectional view of a piston-cylinder actuator including piston rings.
Figure 2:
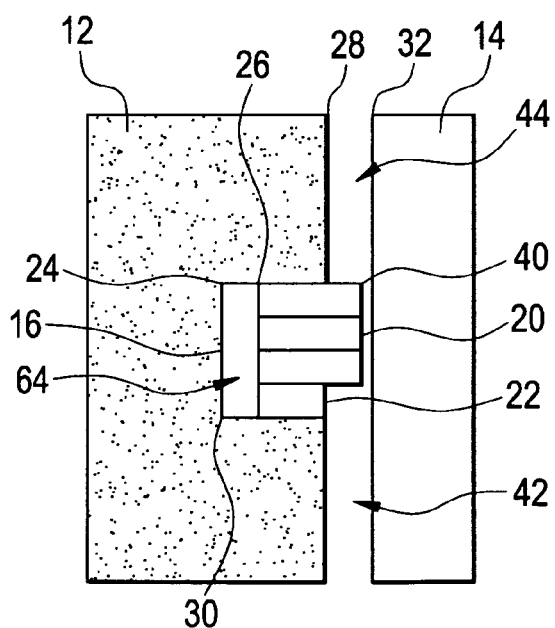
FIG. 2 is an enlarged view of the circled area "A" in FIG. 1.

Referring to FIG. 1, a piston-cylinder actuator 10 includes a piston 12 which is disposed at least partially inside of a cylinder 14. The piston 12 defines one or more piston ring grooves 16 around the circumference of the piston 12 into which one or more piston rings 20 are assembled. As shown in FIG. 2, the one or more piston rings 20 are located in the one or more piston ring grooves 16 against a low pressure face 24 of each piston ring groove 16, and are preloaded against the low pressure face 24 by insertion of a wave spring 22 in each piston ring groove 16 on a high pressure side of the one or more piston rings 20. Using a wave spring 22 to preload the one or more piston rings 20 against the low pressure face 24 of each piston ring groove 16 creates a seal between the one or more piston rings 20 and the low pressure face 24 preventing leakage from a high pressure side 42 of the actuator 10 to a low pressure side 44 of the actuator 10.

Figure 3:
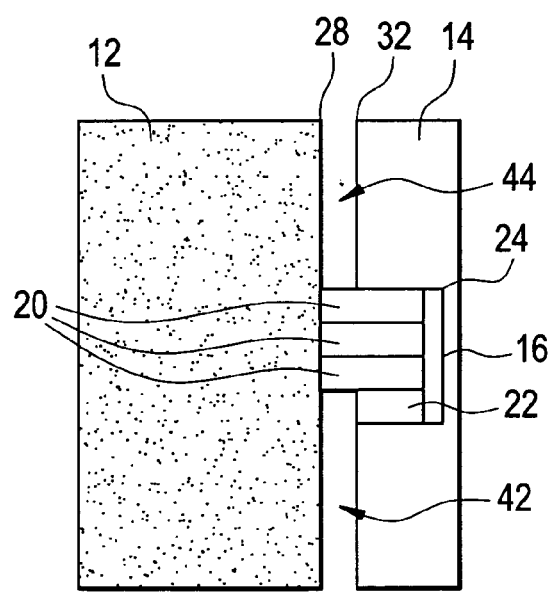
FIG. 3 is a view of an alternative embodiment of a piston-cylinder actuator including piston rings.

Alternatively as shown in FIG. 3, the one or more piston ring grooves 16 may be disposed in the cylinder 14. In this embodiment, the one or more piston rings 20 are located in the one or more piston ring grooves 16 against a low pressure face 24 of each piston ring groove 16, and are preloaded against the low pressure face 24 by insertion of a wave spring 22 in each piston ring groove 16 on a high pressure side of the one or more piston rings 20.

Returning again to FIG. 2, parameters of the one or more piston rings 20, such as the material, quantity, thickness, and radial width, are selected so the one or more piston rings 20 are compliant to an inside diameter 32 of the cylinder 14, and thus effectively seal the actuator 10 while biasing wear to the more easily replaceable one or more piston rings 20. For example, utilizing a stack of multiple thin piston rings 20 may be more desirable than using one relatively thick piston ring 20 in the same actuator 10, because the combined axial stiffness in a direction parallel to an axis of the piston 12 of the stack of thin piston rings 20 is the same as that of the one thick piston ring 20, and the thin piston rings 20 conform better to the inside diameter 32 of the cylinder 14 because of their lower stiffness in a direction perpendicular to the axis of the piston.

Figure 4:
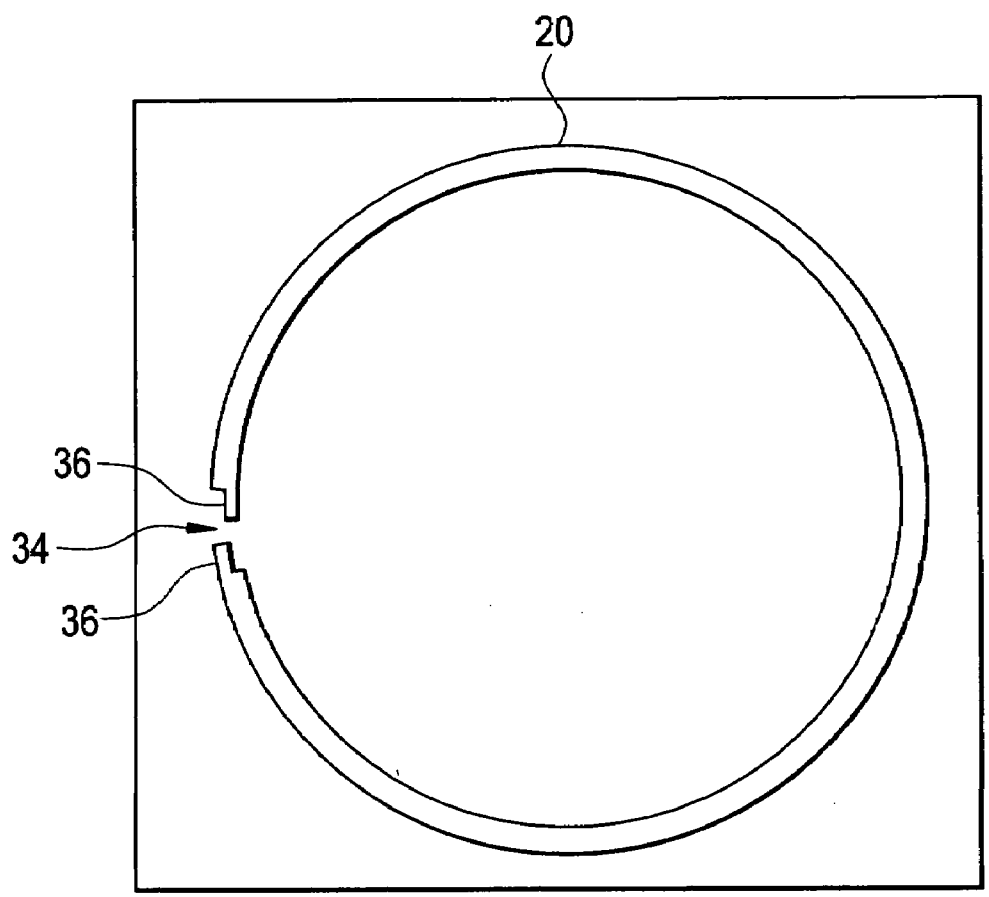
FIG. 4 is a view of a piston ring.

Each piston ring 20 has a inside diameter 26 that is smaller than a diameter 28 of the piston 12, but larger than a diameter 30 of the one or more piston ring grooves 16; and an outside diameter 40 that is large enough to seal with the inside diameter 32 of the cylinder when the actuator 10 is internally pressurized. As shown in FIG. 4, each piston ring 20 contains a split 34 to allow ends 36 of the piston ring 20 to be pulled apart and the piston ring 20 then installed in the piston ring groove 16.

To reduce leakage from the high pressure side 42 of the actuator 10 to the low pressure side 44 of the actuator 10, the split 34 in each piston ring 20 is configured as a lap joint as shown in FIG. 4, thereby leaving a leakage path between the ends 36 of each piston ring 20 that is small and tortuous when the piston ring 20 is installed on the piston 12. Additionally, in a case where multiple piston rings 20 are inserted into each piston ring groove 16, the piston rings 20 are stacked when assembled such that each split 34 is disposed 180 degrees circumferentially from the split 34 in the piston ring 20 adjacent to it. For example, if the split 34 in a first piston ring 20 in a stack of three piston rings 20 is disposed at approximately 0 degrees, then the split 34 in a second piston ring 20 is disposed at approximately 180 degrees, and the split 34 in a third piston ring 20 is disposed at approximately 0 degrees. Orientation of the splits 34 in the respective piston rings 20 in this manner results in a second tortuous leakage path from each piston ring split 34 to each other piston ring split 34, thus minimizing leakage from the high pressure side 42 to the low pressure side 44.

Figure 5:
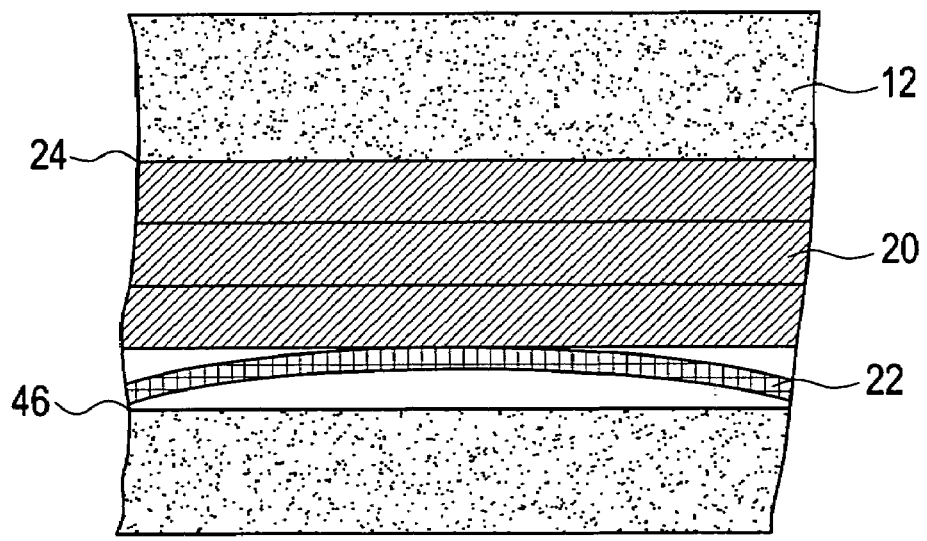
FIG. 5 is a partial inward looking view of piston rings and a wave spring or leaf spring installed.
Figure 7:
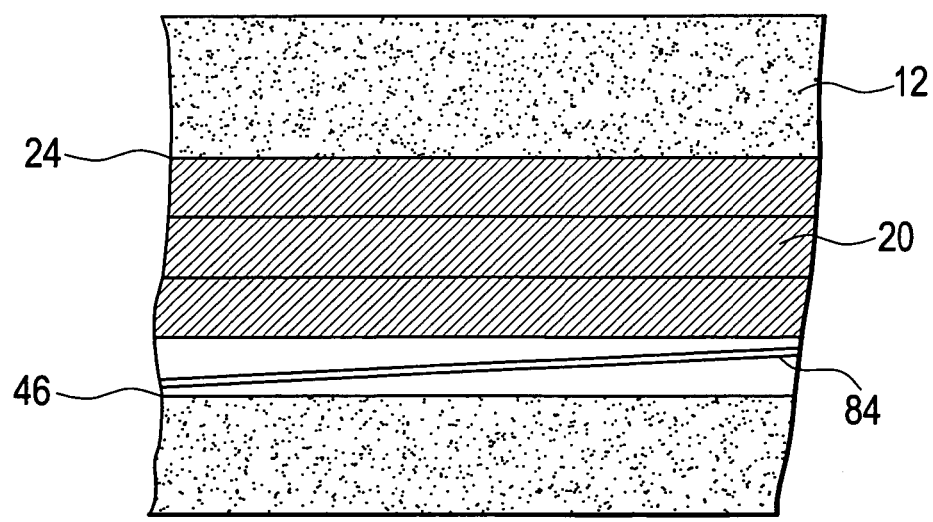
FIG. 7 is a partial inward looking view of piston rings and a helical spring installed.

A wave spring 22 is inserted into each of the one or more piston ring grooves 16 on the high pressure side 42 of the actuator 10. The wave spring 22 has a wave shape around the circumference. As illustrated in FIG. 5, the wave spring 22 is such that when the wave spring 22 is inserted into the piston ring groove 16, gaps are created between the wave spring 22 and an adjacent piston ring 20, and between the wave spring 22 and a high pressure face 46 of the piston ring groove 16. This invention is not limited to using a wave spring 22 inserted in each piston ring groove 16. Other spring types, for example a helical spring 84 as shown in FIG. 7 or leaf spring segments, which FIG. 5 also illustrates, arranged around the circumference may be used.

The wave spring 22 acts to preload the piston rings 20 to the low pressure face 24 of each of the one or more piston ring grooves 16 thus minimizing leakage from the high pressure side 42 of the actuator 10 to the low pressure side 44 of the actuator 10. The wave spring 22 is split similar each piston ring 20 to facilitate assembly into the one or more piston ring grooves 16. To further minimize leakage, the wave spring 22 is inserted in the piston ring groove 16 such that the split in the wave spring 22 is approximately 180 degrees opposite the split 34 in an adjacent piston ring 20. Thus, the piston rings 20 are preloaded against the face 24 of the piston ring groove 16 providing initial sealing before the actuator 10 is pressurized.

In one embodiment, the cylinder 14 has an inside diameter 32 larger than the piston 12 and the piston 12 is disposed therein. Additionally, the base 50 of the cylinder 14 is a truncated cone shape. The truncated cone shape, with its resulting increased thickness at the center of the base 50 of the cylinder 14, increases the strength and stiffness of the cylinder 14 which gives the cylinder 14 a greater ability to withstand high actuation fluid pressures without undergoing large deformations or failure. As shown in FIG. 1, the cylinder 14 includes an input port 52, which allows for introduction of actuation fluid from outside the cylinder 14 to the inside of the cylinder 14.

In another embodiment, the cylinder 14 may also include a flow uniformity groove 54 at the base of the inner inside diameter 32 of the cylinder 14. The flow uniformity groove 54 is in place to equalize the pressure around the circumference of the cylinder 14 upon initial pressurization of the actuator 10. Initially the piston 12 is fully retracted, resting on the base 50 of the cylinder 14. When actuation fluid is input into the cylinder 14 through the input port 52, the actuation fluid fills the flow uniformity groove 54 around the entire circumference first, and the piston 12 is then raised. The equalized pressure around the circumference of the cylinder 14 because of the presence of the flow uniformity groove 54, causes an initial motion of the piston 12 to be closer to parallel to the inside diameter 32 of the cylinder 14. This reduces potential wear and increases the actuator's potential work producing capability.

In yet another embodiment, and as shown in FIG. 1, to prevent rotation of the piston 12 relative to the cylinder 14 during operation of the actuator 10, the cylinder 14 also includes a clocking slot 58 in the base 50. In a corresponding location on a bottom face 62 of the piston 12 and protruding from it is a clocking pin 60. As the piston 12 is actuated inside the cylinder 14, the clocking pin 60 remains located inside the clocking slot 58 and thus the piston 12 is prevented from rotating relative to the cylinder 14.

The piston 12 and the one or more piston rings 20 provide a unique way of enhancing the sealing between the piston 12, the one or more piston rings 20, and the inside diameter 32 of the cylinder 14 during operation of the actuator 10. When the actuator 10 is initially pressurized by actuation fluid flowing in through the input port 52 in the cylinder 14, the actuation fluid fills a gap between the wave spring 22 and the piston ring groove 16, the gap between the wave spring 22 and an adjacent piston ring 20 and a space 64 between the inner diameter 26 of the one or more piston rings 20 and the diameter 30 of the piston ring groove 16. The pressure of the actuation fluid in the space 64 exerts a radially outward force on the one or more piston rings 20, thereby enhancing the sealing between the one or more piston rings 20 and the inside diameter 32 of the cylinder 14. Improved sealing of the actuator 10 allows for higher fluid pressures inside the actuator 10 resulting in higher possible actuation forces.

In one embodiment, the cylinder 14 is made of a material with greater wear resistance properties than the one or more piston rings 20. Then, as the actuator 10 functions over time, the shape of the one or more piston rings 20 will conform to the inside diameter 32 of the cylinder 14. Thus, the sealing between the one or more piston rings 20 and the inside diameter 32 of the cylinder 14 will be further improved.

Figure 6:
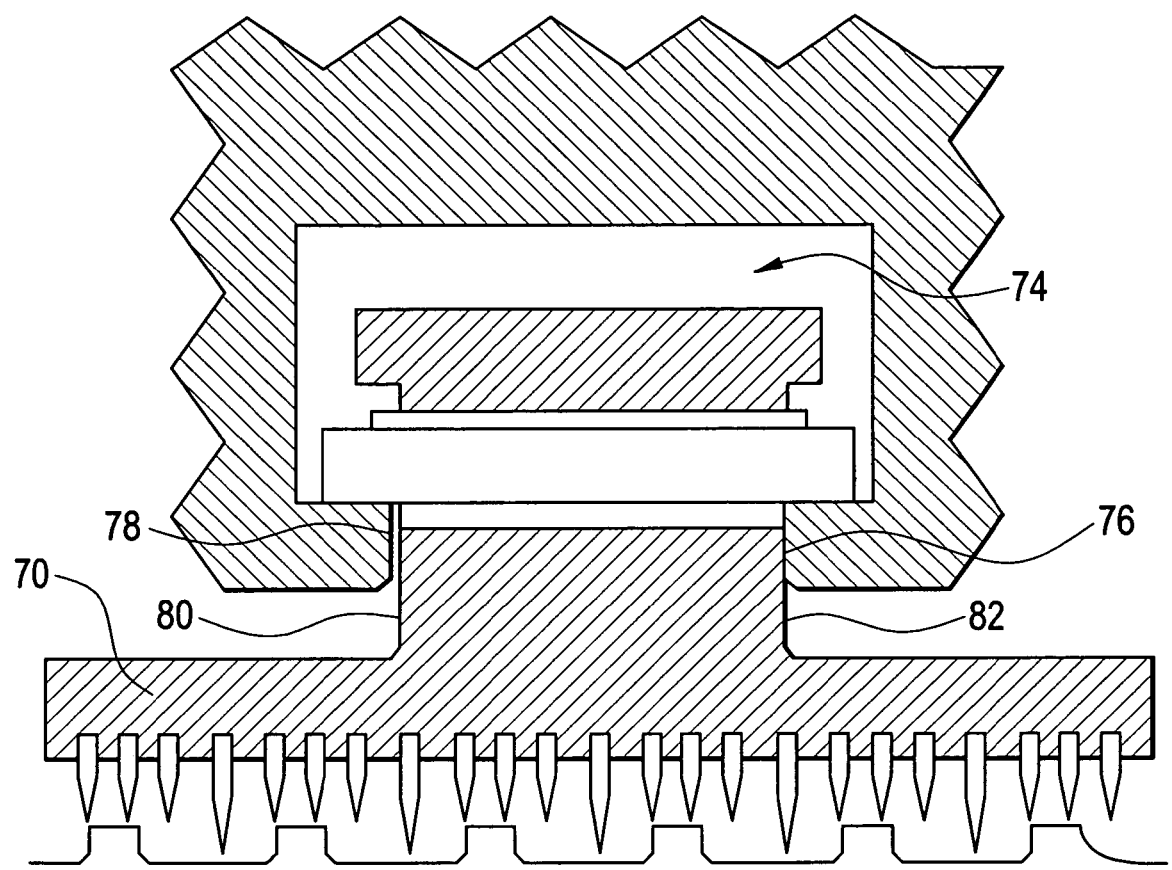
FIG. 6 is a cross sectional view of an adjustable seal.

Another aspect is an improved method for actuating adjustable seals using the above-described piston-ring sealed actuators. FIG. 6 illustrates one such actuation method. An actuation force 82 is first applied axially in this case, instead of radially. Once an axial loading force 80 is overcome and contact at the primary sealing face 76 is broken, high-pressure fluid from a cavity 74 can escape thus equalizing a pressure distribution around an adjustable seal 70. Thus when a radial actuation of the adjustable seal 70 is performed, the actuation force required is less, and the forces acting on the adjustable seal 70 do not vary so widely and a motion of the adjustable seal 70 can be controlled more precisely. Also, this process helps reduce the size and number of actuators required, because the adjustable seal 70 is no longer in contact with the primary sealing face 76 during the radial actuation. Thus there is a significant reduction in necessary actuation force because of a large reduction in a radial pressure load and elimination of an interface friction force.

Alternatively, an actuation method may be implemented in which the axial actuation of the adjustable seal 70 may move the sealing face from the primary sealing face 76 to the secondary sealing face 78. This results in low pressure above the adjustable seal 70, and thus a force required to move the adjustable seal 70 in the radial direction is significantly reduced. Consequently, the number and size of actuators required to move the adjustable seal 70 can be reduced.

While embodiments of the invention have been described above, it will be understood that those skilled in the art, both now and in the future, may make various improvements and enhancements which fall within the scope of the claims which follow. These claims should be construed to maintain the proper protection for the invention first described.

What is claimed is:

1. A fluidic actuator comprising:
    a cylinder having an input port;
    a piston disposed at least partially within the cylinder, the piston having a diameter and including a piston ring groove around a circumference of the piston, the piston ring groove having a low pressure face and a high pressure face;
    a piston ring located against the low pressure face of the piston ring groove such that a space exists between an inside diameter of the piston ring and the piston ring groove, the piston ring having an outside diameter that is larger than the diameter of the piston to provide a seal between the piston ring and the cylinder when the actuator is pressurized; and
    a spring disposed in the piston ring groove adjacent to the piston ring and located against the high pressure face of the piston ring groove such that a gap exists between an inner diameter of the spring and the piston ring groove, wherein the spring preloads the piston ring to provide a seal between the piston ring and the low pressure face of the piston ring groove, thereby preventing leakage between a high pressure side of the actuator and a low pressure side of the actuator;
    wherein actuation fluid fills the gap between the spring and the piston ring groove and fills the space between the piston ring and the piston ring groove when the actuator is pressurized to exert a radially outward force on the piston ring, thereby enhancing the seal between the piston ring and the cylinder,
    wherein the piston ring is split from the inner diameter to the outer diameter to facilitate insertion of the piston ring into the piston ring groove, and
    wherein a plurality of piston rings are inserted within the piston ring groove, and wherein at least one of the piston rings is assembled within the piston ring groove such that an angular location of the split in the piston ring is different from the angular location of the split in an adjacent piston ring.

2. The fluidic actuator of claim 1 wherein the spring comprises a wave spring.

3. The fluidic actuator of claim 1 wherein the spring comprises a helical spring.

4. The fluidic actuator of claim 1 wherein the spring comprises one or more leaf spring segments.

5. The fluidic actuator of claim 1, wherein the wave spring is split from an inner diameter to an outer diameter to facilitate insertion of the wave spring into the piston ring groove.

6. The fluidic actuator of claim 5, wherein the split in the wave spring is assembled within the piston ring groove such that an angular location of the split in the wave spring is different from the angular location of the split in the piston ring.

7. The fluidic actuator of claim 1, wherein the cylinder is made of a greater wear resistant material than the piston ring.

8. The fluidic actuator of claim 1, wherein the cylinder includes a circumferential flow uniformity groove disposed at an intersection between a base and an inside diameter of the cylinder.

9. The fluidic actuator of claim 1, wherein the cylinder further includes a clocking slot in a base of the cylinder.

10. The fluidic actuator of claim 9, wherein the piston includes a bottom face having a clocking pin protruding from the bottom face at a corresponding location to the clocking slot in the base of the cylinder such that a portion of the clocking pin is received in the clocking slot to prevent relative circumferential rotation between the cylinder and the piston.

11. The fluidic actuator of claim 1, wherein a base of the cylinder is a truncated cone shape.

12. A fluidic actuator comprising:
    a cylinder having an input port and including a piston ring groove around a circumference of the cylinder, the piston ring groove having a low pressure face and a high pressure face;
    a piston disposed at least partially within the cylinder, the piston having a diameter;
    a piston ring located against the low pressure face of the piston ring groove such that a space exists between an outside diameter of the piston ring and the piston ring groove, the piston ring having an inside diameter that is smaller than the inside diameter of the cylinder to provide a seal between the piston ring and the piston when the actuator is pressurized; and
    a spring disposed in the piston ring groove adjacent to the piston ring and located against the high pressure face of the piston ring groove such that a gap exists between an outside diameter of the spring and the piston ring groove, wherein the spring preloads the piston ring to provide a seal between the piston ring and the low pressure face of the piston ring groove, thereby preventing leakage between a high pressure side of the actuator and a low pressure side of the actuator; and wherein actuation fluid fills the gap between the spring and the piston ring groove and fills the space between the piston ring and the piston ring groove when the actuator is pressurized to exert a radially inward force on the piston ring, thereby enhancing the seal between the piston ring and the cylinder, wherein the piston ring is split from the inner diameter to the outer diameter to facilitate insertion of the piston ring into the piston ring groove, and wherein a plurality of piston rings are inserted within the piston ring groove, and wherein at least one of the piston rings is assembled within the piston ring groove such that an angular location of the split in the piston ring is different from the angular location of the split in an adjacent piston ring.

13. The fluidic actuator of claim 12 wherein the spring comprises a wave spring.

14. The fluidic actuator of claim 12 wherein the spring comprises a helical spring.

15. The fluidic actuator of claim 12 wherein the spring comprises one or more leaf spring segments.

16. The fluidic actuator of claim 12, wherein the cylinder includes a circumferential flow uniformity groove disposed at an intersection between a base and an inside diameter of the cylinder.

17. The fluidic actuator of claim 12, wherein the cylinder further includes a clocking slot in a base of the cylinder, and wherein the piston includes a bottom face having a clocking pin protruding from the bottom face at a corresponding location to the clocking slot in the base of the cylinder such that a portion of the clocking pin is received in the clocking slot to prevent relative circumferential rotation between the cylinder and the piston.

18. The fluidic actuator of claim 12, wherein a base of the cylinder is a truncated cone shape.

* * * * *